J. S. COOK.
JACK FOR AUTOMOBILES.
APPLICATION FILED SEPT. 15, 1919.
1,348,627.
Patented Aug. 3, 1920.
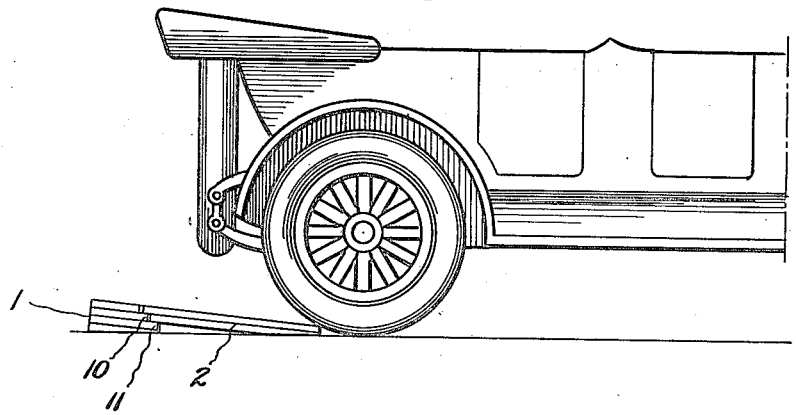
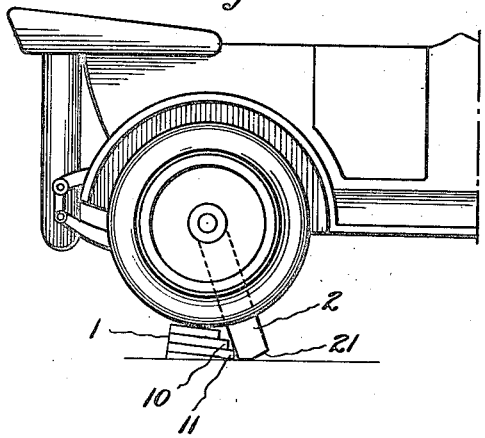
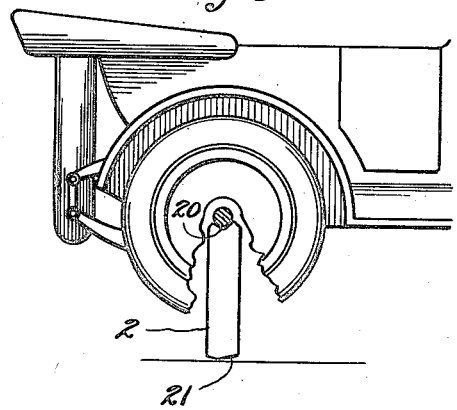
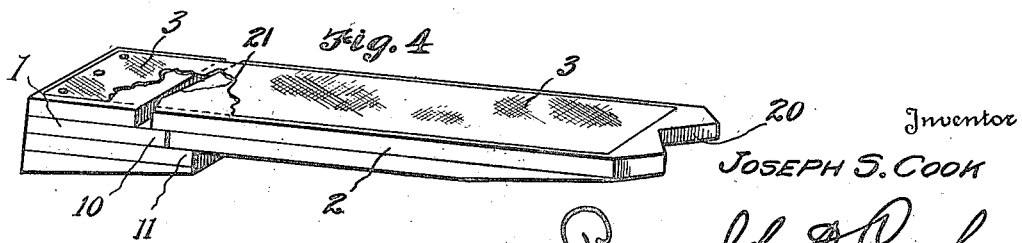
Inventor
JOSEPH S. COOK
By Reynolds H. Cook.
Attorney

UNITED STATES PATENT OFFICE.

JOSEPH S. COOK, OF TACOMA, WASHINGTON.

JACK FOR AUTOMOBILES.

1,348,627.  Specification of Letters Patent.  Patented Aug. 3, 1920.

Application filed September 15, 1919. Serial No. 323,889.

*To all whom it may concern:*

Be it known that I, JOSEPH S. COOK, a citizen of the United States, and resident of Tacoma, Pierce county, Washington, have invented certain new and useful Improvements in Jacks for Automobiles, of which the following is a specification.

My invention relates to vehicle jacks or devices for use in raising and supporting a vehicle axle from the ground.

The object of my invention is to provide a device of this character which is cheap and easy to make and by the use of which the vehicle axle may be raised and supported from the ground by using the propulsive power of the vehicle.

I will herein describe the manner of constructing my invention in the preferred form and will then define what I deem to be patentable by the claims.

Figure 1 shows a side view of the rear part of an automobile with my device in position for use.

Fig. 2 shows the rear portion of the automobile raised upon a supporting block and with the post or strut member, in position for supporting the automobile.

Fig. 3 shows the device in a final stage, or that wherein the vehicle axle is supported by the strut or post, with the wheel clear of the ground.

Fig. 4 shows in perspective my device separate from the car and in the position for the reception of the wheel thereon.

My invention comprises two principal parts, first a block 1 which is designed for supporting the car through the medium of the wheel in raised position, and second, a post or strut member which is adapted to serve, first, as an inclined run-way by the use of which the wheel may be placed upon the block and which is then adapted to be placed vertically under the axle to sustain the same.

The block 1 is of a thickness sufficient to support the wheel in a raised position a suitable distance above the ground.

This block ordinarily, would be from three to four inches thick, although the exact thickness is immaterial, so long as it is sufficient for the purpose. This block is preferably thicker at one edge than at the other, so that its upper surface is inclined. Along the thin edges of the block, I provide it with one or more steps or ledges, as 10 and 11, these being designed for supporting engagement with one end of the post or run-way member 2.

The post or run-way member 2 at one end is notched or cut away, so as to form satisfactory bearing engagement with the ledges as 10 and 11 of the block 1. As herein shown this member 2 has been made of two layers of wood secured permanently together, the under layer being recessed back from the end of the upper layer. The end of this post 2 which is away from the block when in use as a run-way member, is preferably beveled so as to cause but a slight rise in running the wheel thereon. It is also preferably provided with a notch 20, of such character as to receive the axle and to secure and hold the same thereon.

In using the device it is assembled in the manner shown in Fig. 4, wherein one end of the run-way member 2 is supported by the ledges of the block 1. In this position it is assembled in line with the wheel which it is desired to raise from the ground. The car is then moved so as to bring the wheel upon the block 1. The brakes of the car are then set so as to hold it in this position. The run-way member 2 is then removed and placed under the axle in the position shown in Fig. 2; the car is then permitted to run down off of the block 1, until the post is in a vertical position, or as shown in Fig. 3. It is then held by application of the brakes and the block 1 may then be removed.

The end of the run-way member which is placed upon the block 1, and which, when it is used as a supporting post is placed upon the ground, has this end edge cut slightly on a bevel as shown at 21. The high point of the end edge is thus brought comparatively near one side of the post. In use, this edge of the post is placed next to the block, so as, when the car moves down the block, it will have a shorter distance to go in order to get over the main supporting point; in other words the beveling of the end of the post will assist somewhat in helping the car to move into its final position, or that shown in Fig. 3.

I prefer to secure to the upper surface of the block 1, a strip 3 of canvas, gunny sacking, or other strong fabric, of a length and width to substantially cover the upper surface of both the block 1 and the run-way member 2. This forms a superior traction surface and prevents possibility of splinters and roughnesses of the boards from injuring the tire.

The above device may be made from ordinary materials at a very slight cost and may be as conveniently used as other devices for the purpose of supporting the axle while removing a tire, or for any other purpose.

Claims:

1. A vehicle jack comprising a block having an inclined upper surface and an inclined runway member adapted to be supported by one end on the block and when placed on end to engage the vehicle axle to support it.

2. A vehicle jack comprising a block having ledges on one edge and a runway member having one end cut to fit on said ledges, and its other end notched to form a seat for the vehicle axle.

3. A vehicle jack comprising a block having a taper toward one edge, said edge being stepped, a runway member of a length to act as a supporting post when placed on end under the axle, one end of said runway member being stepped to fit the steps of the block and also having its end surface cut to produce the high spot well toward one side, the other end being notched to form a seat for the axle.

Signed at Tacoma, Washington, this 27th day of August, 1919.

JOSEPH S. COOK.